United States Patent
Martin

[15] 3,660,891
[45] May 9, 1972

[54] FILLER METAL ALLOY FOR TITANIUM BRAZING

[72] Inventor: Geoffrey Martin, Nashville, Tenn.

[73] Assignee: Avco Corporation, Nashville, Tenn.

[22] Filed: Sept. 21, 1970

[21] Appl. No.: 74,153

[52] U.S. Cl. ..................................29/494, 29/498, 29/504, 29/DIG. 45
[51] Int. Cl. ..................................B23k 31/02, B23k 35/38
[58] Field of Search..................29/494, 498, 504, DIG. 45

[56] References Cited

UNITED STATES PATENTS

| | | | |
|---|---|---|---|
| 3,010,198 | 11/1961 | Hanink et al. | 29/498 X |
| 3,213,532 | 10/1965 | Glaser et al. | 29/498 X |

FOREIGN PATENTS OR APPLICATIONS

| | | | |
|---|---|---|---|
| 164,123 | 7/1955 | Australia | 29/504 |
| 164,124 | 7/1955 | Australia | 29/504 |
| 833,758 | 4/1960 | Great Britain | 29/504 |

*Primary Examiner*—John F. Campbell
*Assistant Examiner*—Ronald J. Shore
*Attorney*—Charles M. Hogan and Irwin P. Garfinkle

[57] ABSTRACT

The disclosure is a brazing method for uniting two or more titanium components, e.g., as in fabricating titanium honeycomb sandwich structures, utilizing a filler metal alloy composition which has the unique property of not only permitting the formation of strong brazed joints but also permitting the brazing operation to be carried out at lower temperatures and within a temperature range that is increased more than three-fold over that heretofore attainable.

6 Claims, No Drawings

FILLER METAL ALLOY FOR TITANIUM BRAZING

BACKGROUND OF THE INVENTION

Titanium and titanium base alloys are presently regarded as a particularly satisfactory and effective metal for use in air foils and airframes for supersonic aircraft. The brazing of titanium members for such use, particularly titanium honeycomb cores sandwiched between thin cover sheets of titanium and unified into an integral whole has posed difficult problems for airframe manufacturers. Assuming that the proper conditions of cleanliness and a non-oxidizing atmosphere are present during the brazing operation, it has been found that temperature conditions must be maintained within very narrow limits to insure proper bonding. One filler metal alloy proposed for this purpose is one consisting principally of aluminum with the addition of 1.2 percent of manganese and having a melting point of between 1,190° and 1,210° F. Accordingly, when brazing with this alloy the brazing of titanium members must be accomplished at temperatures which are maintained closely within a range of 1,225° F. through 1,265° F. Members brazed below 1,225° F. exhibit insufficient braze and lack of filleting since the filler does not flow below 1,220° F. Satisfactory brazing above 1,265° F. becomes difficult as the formation of $TiAl_3$ is rapidly increased. For instance, brazing at 1,275° F. for 12 minutes usually results in a joint consisting entirely of the $TiAl_3$ brittle compound.

For large members such as honeycomb wing panels for aircraft, this presents great practical difficulty, since failure to bring each of the numerous joints, which are distributed throughout this large area, to the precise temperature required and to maintain them at that temperature for the prescribed time, results in faulty bonds. This, in turn, leads to the rejection of the part by the inspectors and substantial loss to the manufacturer, since reprocessing requires considerable time and expense.

THE INVENTION

The composition utilized in the invention is especially suitable for solving the problem of efficiently brazing titanium components, particularly components of large mass. It comprises a particular combination of metals, which has the following unique properties: the brazing alloy composition "wets" the titanium at relatively low temperatures, it exhibits a low propensity to form highly undesirable brittle compounds such as $TiAl_3$, and thus promotes the formation of a strong brazed joint, and it also permits brazing of titanium and titanium base alloys to be accomplished at lower temperatures and over a much wider range or spread of temperatures than has heretofore been attainable. I found that the composition of the present invention permits acceptable brazing of titanium and titanium base alloys to be accomplished throughout a temperature range which is increased more than threefold over that attainable by the prior art.

The preferred embodiment of my brazing alloy comprises 91.35 percent of aluminum, 4.8 percent of silicon, and 3.85 percent of copper, by weight. During brazing, the aluminum appears to dissolve the titanium while the silicon appears to reduce the solvent action and to increase the fluidity. The copper appears to decrease fluidity and to depress the melting point of the alloy.

Acceptable variation from the preferred composition are as follows, expressed in percentages by weight:

| Aluminum | 87.35 – 95.35 |
|---|---|
| Silicon | 2.80 – 6.80 |
| Copper | 1.85 – 5.85 |

It should be noted further that reduction of the silicon content raises the liquidus temperature point and although this reduces the fluidity of the alloy it tends to increase the $TiAl_3$ formation which is undesirable as previously noted. Increasing the silicon content up to 12.1 percent would lower the liquidus temperature and increase the fluidity of the alloy, tending to reduce the fillet sizes and increase the capillary flow power, both of which are undesirable for the intended application. On the other hand, decreasing the copper content tends to raise the solidus temperature, reduce the fillet sizes and increase the fluidity of the alloy, all of which are undesirable. Increasing the copper content tends to reduce the solidus temperature, increase the fillet sizes, and reduce the fluidity of the alloy, all of which are beneficial.

The invention is a method utilizing this composition as a filler material and thereby making it possible to produce strong, brazed joints by brazing titanium components within a broad temperature range.

My method of brazing is carried out within a temperature range of 1,130° F. up to 1,350° F. This will be noted to be a spread of 220° F. and to comprise a wider range at lower temperatures than have heretofore been regarded as practical for brazing of titanium and titanium base alloys. Highly satisfactory joints have been made with my formulation by brazing titanium cores between thin sheets of titanium metal at temperatures within this range. The method is particularly adapted to forming fillets between thin titanium sheets and the edges of titanium honeycomb cores, in order to form an integral titanium honeycomb sandwich structure, with strong joints characterized by the minimum presence of $TiAl_3$.

Taking a titanium honeycomb sandwich structure as an exemplary embodiment, the process of the invention may be described as comprising the following steps:

1. Thoroughly cleaning the components (consisting of two thin sheets and a honeycomb core) by conventionally accepted methods;
2. Laying a first titanium sheet in a suitable first fixture member for holding the same, along with the subsequently added components, in a fixed position;
3. Laying a first sheet of filler alloy upon the first sheet in aligned and closely contacting relationship therewith;
4. Laying a titanium honeycomb core upon and aligning it with said first sheet of filler alloy;
5. Laying a second sheet of filler alloy upon the titanium core and aligning it therewith;
6. Laying a second titanium sheet upon said second sheet of filler alloy and aligning it therewith;
7. Laying a second fixture member on said second titanium sheet and aligning it therewith;
8. Enclosing the assembly thus structured in a gas-tight enclosure;
9. Supplying an inert atmosphere to the enclosure;
10. Heating the assembly to a temperature between 1,130° F. to 1,350° F. for a time sufficient to cause the filler metal to flow and form brazed joints at all points at which the respective titanium components abut the adjacent filler alloy sheets; and
11. Cooling the assembly to room temperature.

Normally the inert atmosphere is maintained in the enclosure throughout the whole heating and cooling cycle. However, the corrosion resistance of titanium joints brazed with the alloys of the present invention is improved if clean air is allowed to contact the joint surfaces after cooling the work to 800° F., as the oxide film formed at this elevated temperature appears to be more inert than the oxide which forms at room temperature after the assembly has been removed from the enclosure.

The time to which the assembly is subjected to brazing temperatures will vary, depending upon the mass of the parts being brazed, the ambient temperature and other factors which are well known to those skilled in the art, but in my method, brazing is usually complete within a period of 10 to 20 minutes.

On cooling the brazed joints, the silicon does not stay in solution, but appears to precipitate into allotriomorphic crystals which do not substantially impair the quality of the joints.

It should be particularly noted that alloys comparable in composition with that utilized in the present invention are well known in the art of die casting. In that art molten metal is forced into a die under pressure and is immediately cooled. Under these conditions the copper component acts to increase the fluidity of the die cast metal. Under my conditions the solid alloy is brought relatively slowly up to its melting point and the copper component therein decreases the fluidity of the filler metal, thus permitting the wetting of the titanium and the accomplishment of the brazing operation throughout the wide temperature range indicated. Accordingly, prior art experiences with this type of alloy in the die casting art would lead away from the suggestion of its use in my method, since it would be expected that such alloys would run off at or immediately after capillarily filling the spaces between the separate components and would not form the desired fillets.

In the present specification "titanium" is intended to include not only pure unalloyed titanium, but also commercial alloys of titanium containing alpha and/or beta promoters usually alloyed with the titanium to strengthen the metal and to improve its response to working and heat treatment. Such alloys consist principally of titanium with small amounts of said elements. Since the brazing alloy does not diffuse into titanium or its alloys, and is used below any titanium phase transformations, no metallurgical damage or change is possible as a result of the brazing operation.

Having thus described my invention, I claim:

1. The process of brazing titanium components comprising the steps of
   thoroughly cleaning said components;
   laying a first component in a first fixture member for holding the same in fixed position;
   laying a first thin sheet of filler alloy on and in alignment with the face of said first component;
   laying a second component upon and in alignment with said first sheet;
   laying a second sheet of filler alloy on and in alignment with said second component;
   laying a third component on and in alignment with said second sheet;
   laying a second fixture member on and aligning it with said third component;
   enclosing the assembly in a gas-tight enclosure;
   supplying said enclosure with a non-oxidizing atmosphere and
   heating the assembly to a temperature of between 1,130° F. and 1,350° F. for a period of between 10 and 20 minutes to accomplish brazing,
   each sheet of filler alloy consisting of 91 parts of aluminum, 5 parts of silicon and 4 parts of copper by weight.

2. The process of claim 1 wherein the filler alloy is as follows, in percentages by weight:

| Aluminum | 87.35 – 95.35 |
| Silicon | 2.80 – 6.80 |
| Copper | 1.85 – 5.85 |

3. A process for brazing titanium or titanium base alloys to titanium or titanium base alloys which comprises placing the titanium or titanium base alloy parts to be joined by brazing adjacent to each other;
   heating the parts to a brazing temperature between 1,135° F. and 1,350° F.;
   maintaining the parts while so heated in an inert atmosphere and joining the heated parts using a filler metal alloy 91 percent of aluminum, 5 percent of silicon and 4 percent of copper by weight.

4. The process of claim 3 wherein the filler metal alloy comprises, in percentages by weight:

| Aluminum | 87.35 – 95.35 |
| Silicon | 2.80 – 6.80 |
| Copper | 1.85 – 5.85 |

5. A process for forming fillets between thin titanium sheets and the edges of titanium honeycomb cores to form an integral honeycomb sandwich structure which comprises placing the titanium parts to be joined by brazing adjacent to each other;
   heating the parts to a brazing temperature between 1,135° F. and 1,350° F.;
   maintaining the parts while so heated in an inert atmosphere and joining the heated parts using a filler metal alloy 91 percent of aluminum, 5 percent of silicon and 4 percent of copper by weight.

6. The process of claim 5 wherein the filler metal alloy comprises, in percentages by weight:

| Aluminum | 87.35 – 95.35 |
| Silicon | 2.80 – 6.80 |
| Copper | 1.85 – 5.85 |

* * * * *